Oct. 10, 1933.  S. F. BRIGGS  1,929,477
LUBRICATING MECHANISM FOR AUTOMOTIVE VEHICLES
Filed Aug. 30, 1929  2 Sheets-Sheet 1
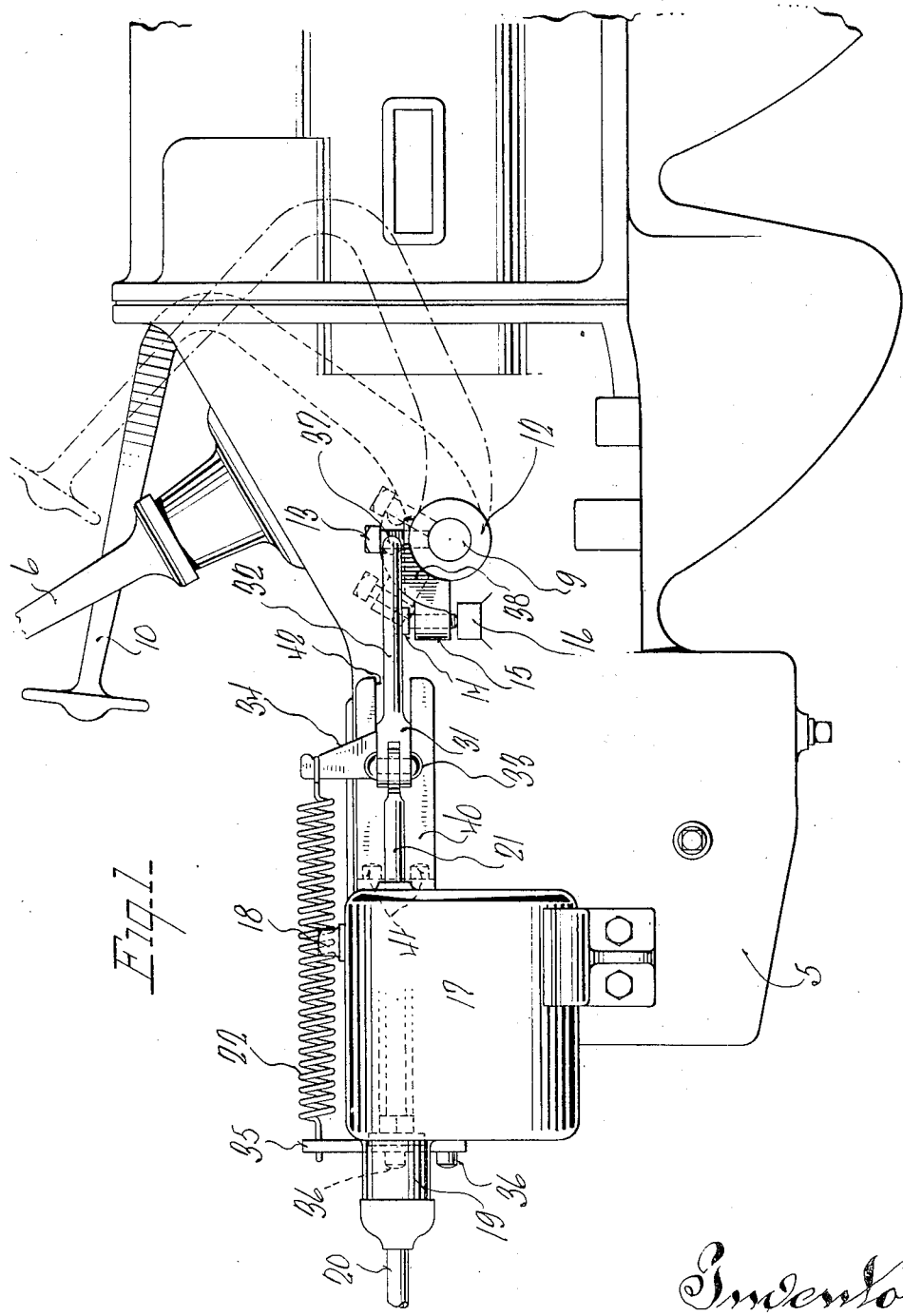

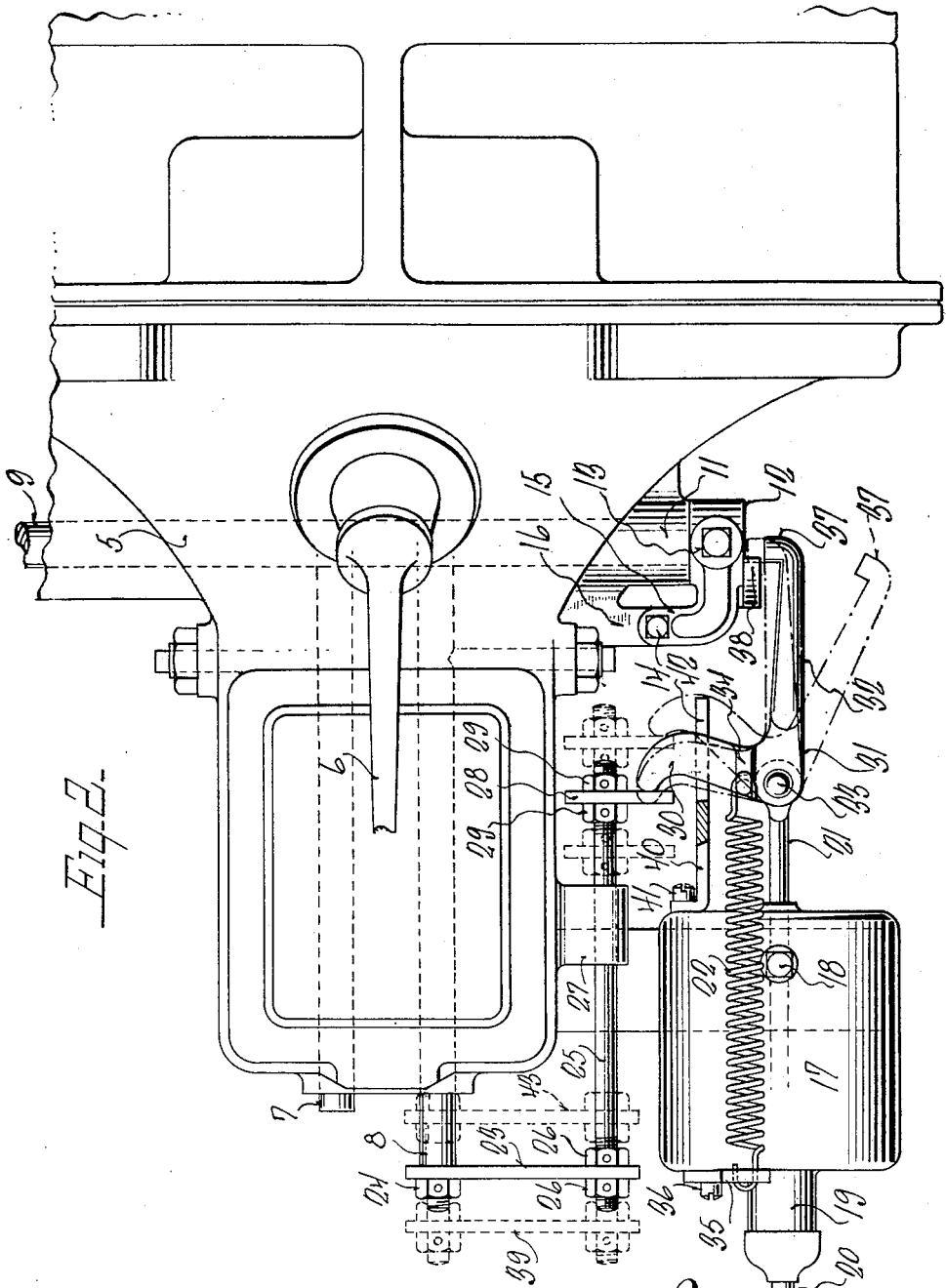

Patented Oct. 10, 1933

1,929,477

UNITED STATES PATENT OFFICE 1,929,477

LUBRICATING MECHANISM FOR AUTOMOTIVE VEHICLES

Stephen F. Briggs, Milwaukee, Wis., assignor to Briggs and Stratton Corporation, Milwaukee, Wis., a corporation of Delaware Application August 30, 1929. Serial No. 389,440

11 Claims. (Cl. 184—7)

This invention relates to certain new and useful improvements in lubricating devices and refers more particularly to means for actuating the mechanism of a lubricating device adapted to simultaneously conduct lubricant to various points on the chassis of an automotive vehicle.

Devices of this type, which are known in the art as "one shot" lubricating systems usually have a foot pedal or an electric push button controlled means of actuation, both of which the operator must remember to actuate periodically. This feature has been objectionable, and therefore this invention has as one of its objects to provide means for actuating the mechanism of a lubricating device of the character described, autotmatically by the performance of one of the usual functions incidental to driving the vehicle, as for instance the actuation of the clutch pedal, ignition switch and starting switch, the removal of the gas tank cover, opening of the hood, etc.

However, as the clutch pedal is ordinarily operated too frequently, it is another object of this invention to provide means whereby the mechanism of the lubricating device is operated by the depression of the clutch pedal only when the transmission gears have been shifted into reverse.

Another object of this invention resides in the provision of a device of the character described, which is of compact design and may be easily applied to vehicles at the time of their manufacture or after they have been in use.

And a more specific object of this invention resides in the provision of a device of the character described wherein a substantially hook shaped member is moved into the path of an abutment movable with the clutch pedal, by the shifting of the gears into reverse, so that the depression of the clutch pedal pulls the hook shaped member against the action of a spring to produce the desired action in the lubricating device proper.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings, I have illustrated one complete example of the physical embodiment of my invention constructed according to the best mode I have so far devised for the practical application of the principles thereof, and in which:

Figure 1 is a side elevational view of a portion of the power plant of an automotive vehicle, particularly the transmission case, illustrating a lubricating device and my improved means for actuating the same applied thereto; and Figure 2 is a top plan view thereof.

Referring now more particularly to the accompanying drawings in which like numerals designate like parts, the numeral 5 represents the transmission case of an automotive vehicle power plant from which a gear shift lever member 6 projects to enable the operator to selectively engage the transmission gears in the well known manner. The means for shifting the gears incorporates a pair of shifter fork rods 7 and 8 longitudinally slidably mounted in the transmission case with their rear ends projected outwardly of the adjacent end wall of the case.

The transmission case also has a transverse clutch pedal shaft 9 journaled therein with a clutch pedal 10 fixed to one end at one side of the case and with its other end projected beyond a bearing boss 11 extended from the opposite side of the case, to have a stop lever arm 12 secured thereto by a set screw 13 or the like. The arm 12 has an adjustable stop screw 14 threaded in its outer inwardly directed end 15 which engages a boss 16 projected from the adjacent wall of the case to limit the rotation of the shaft 9 by the action of the clutch pedal return spring, not shown.

The lubricating system to which my invention is particularly directed includes a reservoir 17 to store a quantity of lubricant, which is inserted through a filler opening closed by a plug 18. One end of the reservoir 17 has a cylinder 19 formed integrally therewith from which a primary lead or lubricant conductor 20 extends to connect with the various branch leads which carry the lubricant to the different points on the chassis to be lubricated; and inasmuch as this structure forms no part of my invention it has not been shown. The lubricant within the reservoir 17 enters the cylinder 19 and is forced therefrom by a piston, not shown, operating within the cylinder upon reciprocation of a piston rod 21, the lubricant entering the cylinder upon outward movement of the piston and its rod, and being forced through the conductor 20 by the compression stroke. A contractile spring 22 placed in tension by the withdrawal of the piston rod, provides the energy for the relatively slow compression stroke.

Heretofore the actuation of the piston rod 21 was dependent upon the memory of the operator as it required the periodic depression of either a foot pedal or an electric push button controlling a magnetic device. This invention overcomes this objectionable feature by providing automatic means for actuating the piston rod which utilizes the performance of one of the normal functions about the vehicle, specifically the depression of the clutch pedal whenever the gears are shifted into reverse.

To this end, the shifter fork rod 8 is slightly extended and has an arm 23 fixed thereto by a nut 24, the outer end of the arm extending to that side of the transmission case at which the rotation limiting lever arm 12 is mounted, to have a rod 25 fixed thereto by jam nuts 26. The rod 25 is slidably mounted in a bearing 27, cast integrally with the transmission case or secured thereto in any conventional manner, and has a second arm 28 fixed to its opposite end by jam nuts 29. The free end of the arm 28 extends into the path of one arm 30 of a bell-crank lever 31 whose other arm 32 forms a hook for a purpose to be later described.

The bell-crank lever 31 is pivotally connected with the end of the piston rod, as at 33 and has one end of the spring 22 connected with it between the point of pivotal connection 33 and the outer end of its arm 30, by means of an upstanding lug or projection 34. The other end of the spring 22 is hooked to a support 35 fixed to the opposite end wall of the reservoir 17 by screws 36, so that the action of the spring 22 is imparted to the piston rod 21 through the bell-crank lever 31.

When the gears of the vehicle are in neutral position the shifter fork rods 7 and 8 are in the positions illustrated in full lines in Figure 2 and the arm 28 holds the bell-crank 31 at such an angle that the outer end 37 of its arm 32 which comprises the hook referred to, is positioned out of the path of an abutment 38 formed integrally with the stop lever 12 which is rotatable with the shaft 9 upon depression of the clutch pedal.

However, when the gears are shifted into reverse the shifter fork rod 8 is moved rearwardly to the dotted line position 39 which moves the arm 28 out of the path of the adjacent end of the arm 30 of the bell-crank lever 31, permitting the same to swing about its pivot 33 by the action of the spring 22. The pivotal movement of the bell-crank lever 31 is guided by a member 40 fixed to the reservoir 17 by screws 41, and having its outer end slotted as at 42 to receive the arm 30 of the bell-crank lever. As the lever is moved by the spring 22 upon rearward movement of the arm 28, the hooked end 37 of its arm 32 moves inwardly into the path of the abutment 38 so that rotation of the shaft 9 by the depression of the clutch pedal carries the bell-crank lever 31 and consequently the piston rod 21 with it; the radial position of the abutment 38 being calculated to impart the proper degree of movement to the piston rod 21.

When the clutch pedal is again released, the shaft 21 and the bell-crank lever 31 are free to be moved rearwardly by the spring 22, and if the gears have been shifted out of reverse position and into intermediate or high the shifter fork rod 8 will have been moved to its original normal position illustrated in full lines in Figure 2 which moves the hooked end 37 of the bell-crank lever 31 out of the path of the abutment 38.

The fact that the compression stroke of the piston rod 21 may not have been completed by the time the bell-crank lever 31 is moved by the return of the shifter fork rod 8, does not effect its operation as the bell-crank then merely pivots in a clockwise direction about the point 33. This condition also takes place when the gears are shifted into low and the shifter fork rod 8 is moved forwardly to the dotted line position 43 to carry the arm 28 forward with respect to its normal position.

From the foregoing description taken in connection with the accompanying drawings, it will be readily apparent to those skilled in the art to which this invention appertains, that I provide a novel manner of actuating the mechanism of a lubricating device which is not dependent upon deliberate or intentional manual operation, but is positively operated by the performance of one of the normal periodic functions incidental to driving the vehicle.

What I claim as my invention is:

1. In combination with an automotive mechanism having a plurality of movable operating and controlling members, lubricating means including distributing conduits and an actuating element to force lubricant through said conduits and adapted to be operated by one of said movable members, and means controlled by a relatively infrequently operated movable member upon operation thereof during the normal usage of the mechanism to couple the actuating element to said first mentioned movable member.

2. In combination with an automotive mechanism having a plurality of movable operating and controlling members, a lubricating device comprising, a source of lubricant supply, distributing conduits and a pump to force lubricant from said source of supply to the various distributing conduits, actuating means for the pump adapted to be operated from a movable member of the mechanism, means at all times tending to couple the actuating means with said movable member, and means controlled by the operation of a relatively infrequently but necessarily operated movable member of the mechanism to govern the connection of the actuating means with said first mentioned movable member.

3. The combination with an automotive vehicle having a plurality of intermittently actuated elements, of a lubricating system for the automotive vehicle including an operating member, means to couple the operating member with one of the intermittently actuated elements upon the operation of a second element of the plurality of elements whereby the succeeding actuation of the first mentioned intermittently actuated element actuates the operating member of the lubricating system.

4. The combination with an automotive vehicle including a movable pedal, of a lubricating system for the automotive vehicle having an operating member, means operable to connect the pedal with the operating member of the lubricating system whereby the movement of the pedal is imparted to the operating member, and means actuated by the pereformance of a usual function during usage of the automotive vehicle for controlling the connection of the movable pedal with the operating member of the lubricating device.

5. The combination with an automotive vehicle having a movable pedal, of a lubricating device including an operating member, means for connecting the operating member with the movable pedal to be moved thereby, and means dependent upon the preordained operation of another element of the automotive vehicle for controlling the connection of the operating member with the movable pedal.

6. The combination with an automotive vehicle including a periodically actuated element, of a lubricating system for the automotive vehicle having an operating member, connectible with the periodically actuated element to be automatically actuated thereby, and means dependent upon the operation of another element of the automotive vehicle for controlling the connection of the operating member with the periodically actuated element.

7. The combination with an automotive vehicle including a plurality of periodically actuated elements, of a lubricating device having an operating member, and means for connecting the operating member with one of the periodically actuated elements upon a predetermined actuation of the other periodically actuated element, whereby the operating member of the lubricating device is actuated automatically by the actuation of the first-mentioned periodically actuated element.

8. The combination with an automotive vehicle having a plurality of movable members which are moved periodically during the normal usage of the vehicle, of a lubricating system including an oil pump and delivery conduits leading from the pump to places at which lubricant is to be applied, means operable to connect the oil pump with one of the movable members whereby the pump is operated by movement of said member, and means operable by the movement of another of the movable members to effect the connection of the oil pump with said first mentioned movable member.

9. The combination with an automotive vehicle including a depressible pedal and means for shifting its transmission gears, of a lubricating device having a movable operating member, means for connecting the movable operating member with the depressible pedal whereby actuation of the pedal moves the operating member, and means whereby the connection of the operating member with the depressible pedal is dependent upon the position of the means for shifting the transmission gears.

10. The combination with an automotive vehicle including a depressible pedal and means for shifting its transmission gears, of a lubricating device including a movable operating member, means for connecting the operating member with the depressible pedal to be movable thereby, and means carried by said gear shifting means for controlling the means for connecting the movable operating member with the depressible pedal whereby the connection of the movable operating member with the depressible pedal is dependent upon the position of the gear shifting means.

11. The combination with an automotive vehicle including a depressible pedal and means for shifting its transmission gears, of a lubricating device including an operating member, means for connecting the operating member with the depressible pedal to be movable therewith, and means whereby the operating member is connectible with the depressible pedal only when the means for shifting the transmission gears is in a predetermined position.

STEPHEN F. BRIGGS.